(12) United States Patent
Urban et al.

(10) Patent No.: US 10,672,104 B2
(45) Date of Patent: Jun. 2, 2020

(54) METHOD AND APPARATUS FOR GENERATING AN EXTRAPOLATED IMAGE BASED ON OBJECT DETECTION

(71) Applicant: INTERDIGITAL CE PATENT HOLDINGS, Paris (FR)

(72) Inventors: Fabrice Urban, Thorigne Fouillard (FR); Philippe Guillotel, Vern sur Seiche (FR); Laura Turban, Rennes (FR)

(73) Assignee: INTERDIGITAL CE PATENT HOLDINGS, SAS, Paris (FR)

( * ) Notice: Subject to any disclaimer, the term of this patent is extended or adjusted under 35 U.S.C. 154(b) by 184 days.

(21) Appl. No.: 15/538,366

(22) PCT Filed: Dec. 18, 2015

(86) PCT No.: PCT/EP2015/080487
§ 371 (c)(1),
(2) Date: Jun. 21, 2017

(87) PCT Pub. No.: WO2016/102365
PCT Pub. Date: Jun. 30, 2016

(65) Prior Publication Data
US 2018/0012333 A1 Jan. 11, 2018

(30) Foreign Application Priority Data

Dec. 22, 2014 (EP) .................................. 14307147

(51) Int. Cl.
*G06K 9/46* (2006.01)
*G06K 9/00* (2006.01)
(Continued)

(52) U.S. Cl.
CPC .............. *G06T 3/40* (2013.01); *G06T 3/4038* (2013.01); *G06T 5/002* (2013.01); *G06T 5/20* (2013.01);
(Continued)

(58) Field of Classification Search
None
See application file for complete search history.

(56) References Cited

U.S. PATENT DOCUMENTS 7,424,218 B2 * 9/2008 Baudisch ............... G03B 13/02
348/218.1
7,853,076 B2 12/2010 Le Meur et al.
(Continued)

FOREIGN PATENT DOCUMENTS

CN 1894721 A 1/2007
CN 101437170 A 5/2009
(Continued)

OTHER PUBLICATIONS

Gao et al. "Visual Saliency Models for Text Detection in Real World", PLOS ONE, Dec. 10, 2014 (Year: 2014).*
(Continued)

*Primary Examiner* — Randolph I Chu
(74) *Attorney, Agent, or Firm* — Invention Mine LLC

(57) ABSTRACT

A method and apparatus for generating an extrapolated image from an existing film or video content, which can be displayed beyond the borders of the existing file or video content to increase viewer immersiveness, are provided. The present principles provide to generating the extrapolated image without salient objects included therein, that is, objects that may distract the viewer from the main image. Such an extrapolated image is generated by determining salient areas and generating the extrapolated image with lesser salient objects included in its place. Alternatively,
(Continued)

salient objects can be detected in the extrapolated image and removed. Additionally, selected salient objects may be added to the extrapolated image.

22 Claims, 6 Drawing Sheets

(51) Int. Cl.
  *G06K 9/32* (2006.01)
  *G06T 3/40* (2006.01)
  *G11B 27/034* (2006.01)
  *G06T 7/70* (2017.01)
  *G06T 5/00* (2006.01)
  *G06T 5/20* (2006.01)
(52) U.S. Cl.
  CPC .............. *G06T 7/70* (2017.01); *G11B 27/034* (2013.01); *G06K 9/4671* (2013.01); *G06T 2207/30241* (2013.01)

(56) References Cited

U.S. PATENT DOCUMENTS

| 2010/0124371 | A1* | 5/2010 | Jiang | G06K 9/4671 382/162 |
|---|---|---|---|---|
| 2014/0320534 | A1 | 10/2014 | Kimura | |
| 2018/0068425 | A1* | 3/2018 | Guillotel | G06T 5/007 |
| 2018/0365800 | A1* | 12/2018 | Suzuki | G06T 3/40 |

FOREIGN PATENT DOCUMENTS

| CN | 101919255 A | 12/2010 |
|---|---|---|
| EP | 1695288 | 6/2005 |
| EP | 2669868 A1 | 12/2013 |
| EP | 2680219 A1 | 1/2014 |
| GB | 2253760 | 9/1992 |
| JP | 2014016688 A | 1/2014 |
| JP | 2014093694 A | 5/2014 |
| JP | 2014215604 A | 11/2014 |
| WO | WO2004006570 | 1/2004 |
| WO | WO2006003600 | 1/2006 |
| WO | WO2016102355 | 6/2016 |

OTHER PUBLICATIONS

Wang et al.,"BiggerPicture: Data-Driven Image Extrapolation Using Graph Matching", ACM Transactions on Graphics (TOG) Nov. 2014 (Year: 2014).*

Novy, D., Computational Immersive Displays, Masters Thesis, Media Arts & Sciences, Massachusetts Institute of Technology, Jun. 2013, pp. 1-79.
Mills et al., "Surround Video", Networked & Electronic Media (NEM) Summit, Turin, Italy, Sep. 27, 2011, pp. 1-9.
Roweis et al., "Nonlinear Dimensionality Reduction by Locally Linear Embedding", Science, vol. 290, Dec. 22, 2000, pp. 2323-2326.
Aides et al., "Multiscale Ultrawide Foveated Video Extrapolation", 2011 IEEE international Conference on Computational Photography (ICCP), Pittsburgh, Pennsylvania, USA, Apr. 8, 2011, pp. 1-8.
Jones et al., "IllumiRoom: Peripheral Projected Illusions for Interactive Experiences", ACM SIGGRAPH 2013 Emerging Technologies, Anaheim, California, USA, Jul. 21, 2013, Article No. 7, p. 1.
Perez Et A., "Poisson Image Editing", ACM Transactions on Graphics (TOG), vol. 22, No, 3, Jul. 2003, pp. 313-318.
Zhong et al., "Robust Object Tracking via Sparsity-based Collaborative Model", 2012 IEEE Conference on Computer Vision and Pattern Recognition (CVPR), Providence, Rhode Island, USA, Jun. 16, 2012, pp. 1838-1845.
Hare et al., "Struck: Structured Output Tracking With Kernels", 2011 IEEE International Conference on Computer Vision (ICCV), Barcelona, Spain, Nov. 6, 2011, pp. 263-270.
Rosin, P., "A simple method for detecting salient regions", Pattern Recognition, vol. 42, No. 11, (2009), pp. 2363-2371.
Yu et al., "An efficient method for scene cut detection", Pattern Recognition Letters, vol. 22, No. 13, 2001, pp. 1379-1391.
Kalloniatis et al., "Visual Acuity", Webvision: The Organization of the Retina and Visual System, http://webvision.med.utah.edu/book/part-viii-gabac-receptors/visual-acuity/, Jun. 5, 2007, pp. 1-41.
Chen et al., "A Joint Spatio-Ternporal Filtering Approach to Efficient Prediction in Video Compression", 2013 Picture Coding Symposium (PCS), San Jose, California, USA, Dec. 8, 2013, pp. 81-84.
Zhang et al., "Key Object Discovery and Tracking Based on Context-Aware Saliency", International Journal of Advanced Robotic Systems, vol. 10, No, 15, 2013, pp. 1-12.
Avraham Etal., "Ultrawide Foveated Video Extrapolation", IEEE Journal of Selected Topics in Signal Processing, vol, 5, No. 2, Apr. 2011, pp. 321-334.
Itti et al., "A Model of Saliency-Based Visual Attention for Rapid Scene Analysis", IEEE Transactions on Pattern Analysis and Machine Intelligence, vol. 20, No. 11, Nov. 1998, pp. 1254-1259.
Le Meur et al., "A Coherent Computational Approach to Model Bottom-Up Visual Attention", IEEE Transactions on Pattern Analysis and Machine Intelligence, vol. 28, No. 5, May 2006, pp. 802-817.
Turban et al., "Extrafoveal Video Extension for an Immersive Viewing Experience", IEEE Transactions on Visualization and Computer Graphics, vol. 23, No. 5, May 2017, pp. 1520-1533.
Mills et al., "Surround Video", British Broadcasting Corp., Research and Development White Paper, WHP 208, Dec. 2011, pp. 1-34.

* cited by examiner

400

500

METHOD AND APPARATUS FOR GENERATING AN EXTRAPOLATED IMAGE BASED ON OBJECT DETECTION

This application claims the benefit, under 35 U.S.C. § 365 of International Application PCT/EP2015/080487, filed Dec. 18, 2015, which was published in accordance with PCT Article 21(2) on Jun. 30, 2016, in English, and which claims the benefit of European Patent Application 14307147.0, filed Dec. 22, 2014.

TECHNICAL FIELD

This invention relates to an apparatus and a method for processing images, and in particular, an apparatus and method for generating an extrapolated image that extend beyond the borders of the existing film or video, wherein the extrapolated image is based on detection of objects in the existing film or video.

BACKGROUND

This section is intended to introduce the reader to various aspects of art, which may be related to various aspects of the present invention that are described and/or claimed below. This discussion is believed to be helpful in providing the reader with background information to facilitate a better understanding of the various aspects of the present invention. Accordingly, it should be understood that these statements are to be read in this light, and not as admissions of prior art.

REFERENCED DOCUMENTS

[1] METHOD OF AND SYSTEM FOR CONTROLLING AN AMBIENT LIGHT AND LIGHTING UNIT, WO2004006570 (A1)—2004 Jan. 15
[2] DOMINANT COLOR EXTRACTION USING PERCEPTUAL RULES TO PRODUCE AMBIENT LIGHT DERIVED FROM VIDEO CONTENT, WO2006003600 (A1)—2006 Jan. 12
[3] P. Mills, A. Sheikh, G. Thomas, and P. Debenham. BBC research & development, white paper WHP 208—surround video. page 34. 2011.
[4] D. E. Novy. Computational immersive display. 2013.
[5] Jones, Brett R; Benko, Hrvoje; Ofek, Eyal; Wilson, Andrew D (2013). "IllumiRoom: Peripheral Projected Illusions for Interactive Experiences". 2013.
[6] A. Aides, T. Avraham, and Y. Schechner. Multiscale ultrawide foveated video extrapolation. In 2011 IEEE International Conference on Computational Photography (ICCP), pages 1-8. 2011.
[7] Sam Roweis & Lawrence Saul. Nonlinear dimensionality reduction by locally linear embedding. Science, v. 290 no. 5500, Dec. 22, 2000. pp. 2323-2326.
[8] Jun Yu, M D Srinath, An efficient method for scene cut detection, Pattern Recognition Letters, 2001, pp 1379-1391.
[9] Paul L. Rosin, A simple method for detecting salient regions, Pattern Recognition 42(2009), pp 2363-2371.
[10] S. Hare, A. Saffari, and P. H. S. Torr. Struck: Structured Output Tracking with Kernels. In ICCV, 2011.
[11] W. Zhong, H. Lu, and M.-H. Yang. Robust Object Tracking via Sparsity-based Collaborative Model. In CVPR, 2012.
[12] Patrick Perez, Michel Gangnet, Andrew Blake, "Poisson image editing", ACM Transactions on Graphics (SIGGRAPH), 2003.
[13] Michael Kalloniatis and Charles Luu, 2007, Visual Acuity.

Image Extrapolation techniques may be used to generate images beyond the borders of an existing film or video image to improve viewer immersiveness while viewing a film or video content. The image extrapolation may be performed based on content in the images to be extended. Such extension seeks to increase the field of vision by projecting content around the screen to surround the spectator with the extended images along with the main image of the film or video. An example arrangement for displaying such extrapolated images is shown in FIG. 1. The main image from the film or video content is displayed on main screen 110, while the extrapolated images are displayed beyond the borders of the main screen 110 on display areas 120, 130 and/or 140 to provide the feeling of immersiveness.

The images may be projected onto the various display areas using different arrangements including those shown in FIGS. 2 and 3. In FIG. 2, a single projection 250 is displayed on main screen 210, and portions of projection 250 are displayed on screens 220, 230 and/or 240. In FIG. 3, arrangement 310 includes a center projection that projects the film or video content onto the center display screen, while 320 includes a left projection that projects the extrapolated image onto the left display screen and 330 includes a right projection that projects the extrapolated image onto the right display screen. Although not shown, a projection may also be provided for an above display screen.

Various systems for projecting specific displays or images around the borders or a film or video have been proposed.

In an Ambilight System developed by Philips Corporation [1], the distribution of colors in the image is studied [2] and a selected main color is projected around the screen using RGB LEDs mounted on the edges of the TV. Smart light bulbs can be added to the setup that can change colors according to the image displayed on the screen. The light projection is done around the TV in a limited area and provides no detail of background nor shape nor motion impression.

A system proposed by Mills et al. [3] comprises a projection system for content acquired with 2 cameras. However, this system doesn't focus on content creation and does not apply image extrapolation to existing content.

The Infinity-by-nine, developed by the MIT Media Lab [4], aims to create an immersive display for TV. The system uses three projectors and 3 screens (on the ceiling and on both sides of the room) to enhance the program displayed on a TV screen. The content on the additional screens is computed in real time from the TV content. The content is created at scene changes and updated from estimated camera motion. Because the technique relies on the motion estimation, it may not work so well for fast changing scenes, scenes with flashes, or scenes with large motion.

IllumiRoom, proposed by Microsoft [5], uses a Kinect sensor and a projector to enhance the TV content by projecting images around a television display. It was mostly developed for immersive gaming to give the illusion that what happens in the game also happens in the player's room. The system projects images directly onto the furniture and walls surrounding the television display to convey events happening beyond the main image on the screen. However, this system does not address the content creation by image extrapolation, that is extrapolating based on content of the image. Content is mostly computer generated by the game renderer.

The Ultrawide Foveated Video Extrapolation [6] technique extrapolates video content around the center image. The key idea of the algorithm is to use a Patch-Match algorithm in space and time dimensions (using video cubes, instead of image blocks) to extrapolate the video outside of its borders. When choosing the right patch, they also penalize patches that are likely to cause distraction (i.e. patches that add many edges outside of the video). The patch used is also selected at random among a few patches with similar cost, to avoid an unnatural repetition of the same patch. To limit computation, the search for a fitting patch is limited to a certain area in the original input video, close to the pixels that are being filled, and the search area is extended if necessary. This algorithm takes several minutes to extrapolate one frame, and as such, may be difficult to implement in real time. The algorithm uses a multi-scale approach to begin the extrapolation at a coarse resolution and refining the resolution in further steps. This technique ensures smooth extrapolation but is very computationally intensive. In addition, the penalization of edge areas does not take into account the human visual system to determine whether the edge is distracting or not. The extrapolated video can miss some relevant structures.

SUMMARY

The present principles are directed to improvements in an apparatus and a method for extrapolating images from original film and video content.

In one respect, the present principles provide a method of generating an extrapolated image that extends beyond a border of an image, comprising: accessing the image; and generating an extrapolated image from a portion of the image, wherein the generating includes identifying a salient object based on a visual attention model, and modifying the generating step so that the salient object is not included in the modified extrapolated image in response to the identifying.

In another respect, the present principles provide a method of generating an extrapolated image that extends beyond a border of an image, comprising: accessing the image; generating an extrapolated image from a portion of the image; generating a saliency map of the extrapolated image based on a visual attention model, and identifying a salient object therefrom; modifying the extrapolated image so that the salient object is not included in the modified extrapolated image.

In another respect, the present principles provide an apparatus for generating an extrapolated image that extends beyond a border of an image, comprising: an input configured to access the image; and a processor, coupled to the input, and configured to generate an extrapolated image from a portion of the image, wherein the generating includes identifying a salient object based on a visual attention model, and modifying the generating process so that the salient object is not included in the modified extrapolated image in response to the identifying; and an output configured to output the modified extrapolated image.

In another respect, the present principles provide an apparatus for generating an extrapolated image that extends beyond a border of an image, comprising: an input configured to access the image; a processor configured to generate an extrapolated image from a portion of the image, to generate a saliency map of the extrapolated image based on a visual attention model, to identify a salient object therefrom, and to modify the extrapolated image so that the salient object is not included in the modified extrapolated image; and an output configured to output the modified extrapolated image.

Additionally, the present principles provide computer program products stored in a non-transitory computer-readable storage media, comprising computer-executable instructions for implementing the methods set forth above.

Additionally, the embodiments described above may include the features of applying spatial filtering, temporal filtering, and adding of selected objects into the extrapolated images.

BRIEF DESCRIPTION OF THE DRAWINGS

The above-mentioned and other features and advantages of this invention, and the manner of attaining them, will become more apparent and the invention will be better understood by reference to the following description of embodiments of the invention taken in conjunction with the accompanying drawings, wherein.

The description set out herein illustrates exemplary embodiments for implementing various aspects of the present principles. Such examples are not to be construed as limiting the scope of the claims in any manner.

DETAILED DESCRIPTION

The described embodiments seek to provide an improved image extrapolation apparatus and method that:

Avoids distracting parts of the video in the extrapolation process by using a visual attention model, specifically, potentially distracting objects in the original film or video are detected so that these potentially distracting objects are not included in the extrapolated image, wherein the extrapolated image may be generated without the distracting objects or the extrapolated image may be modified to remove the distracting objects;

Uses multiple references and long-term references as input content for extrapolation;

Uses spatio-temporal filtering to ensure smooth extrapolation while allowing a coarser extrapolation process;

Adds moving objects in a post processing-step using tracking and trajectory estimation;

Takes into account the Human Visual System properties to create images compatible with the HVS and not disturbing the viewer. In particular, the sensitivity to moving objects in the peripheral vision will be exploited.

Figure 1:
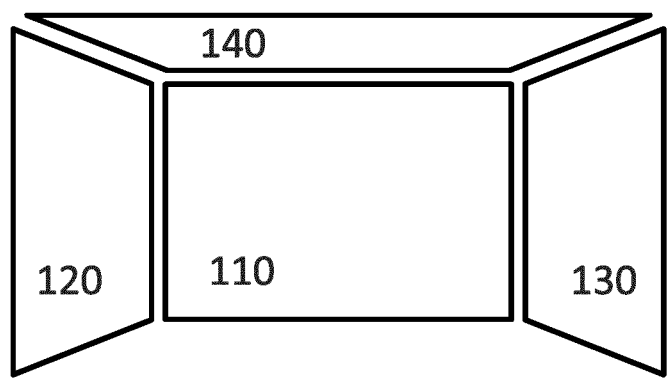
FIG. 1 shows an exemplary arrangement for displaying extrapolated images beyond the borders of a film and/or video display.
Figure 2:
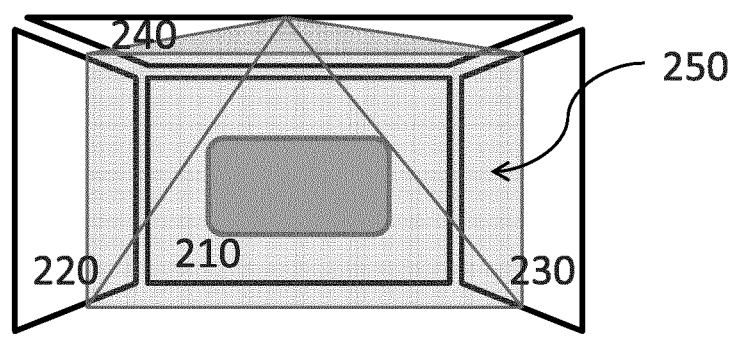
FIG. 2 shows an exemplary arrangement for projecting an image onto various display screens.
Figure 3:
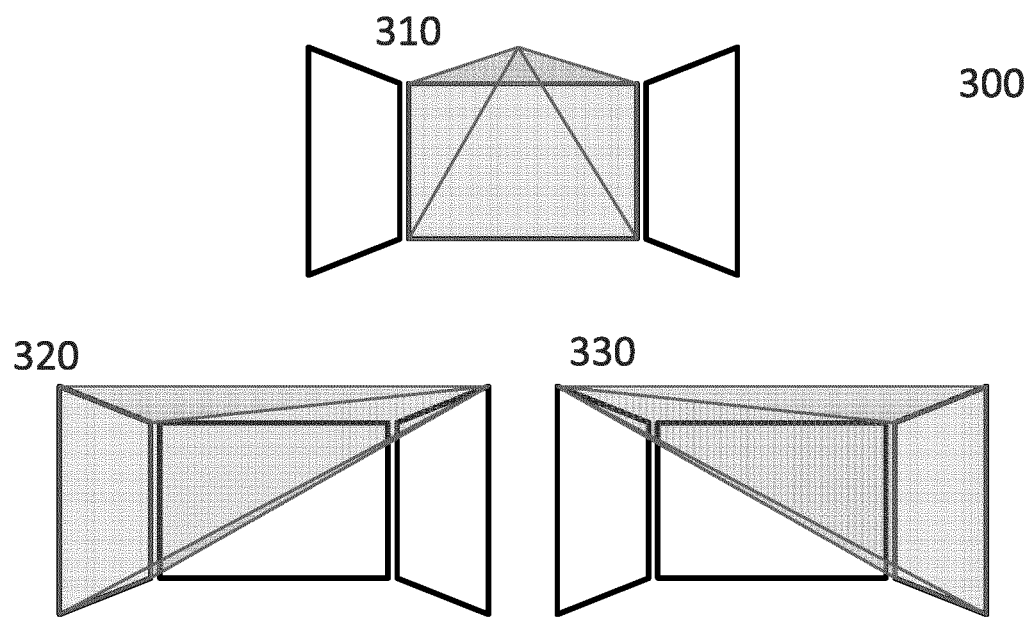
FIG. 3 shows an exemplary arrangement for projection images onto various display screens.
Figure 4:
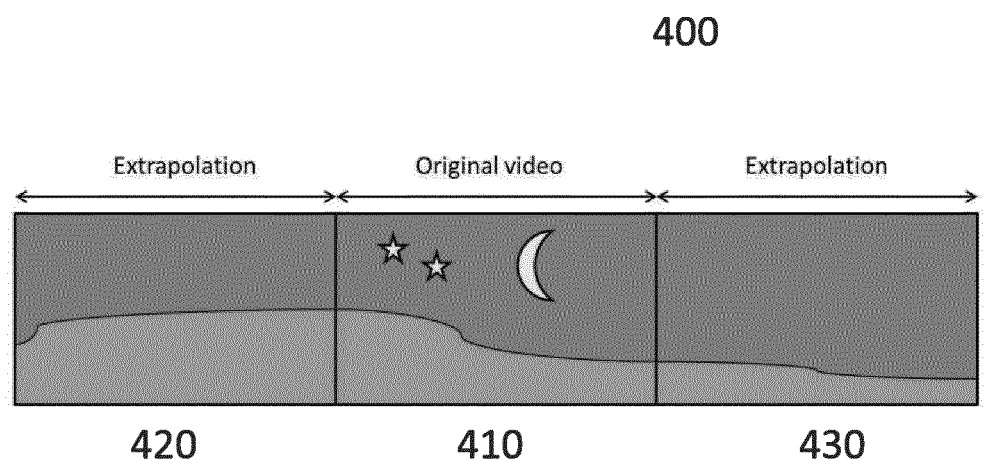
FIG. 4 illustrates an exemplary image including an original image and extrapolated images generated and displayed beyond the left and right borders of the original image.
Figure 5:
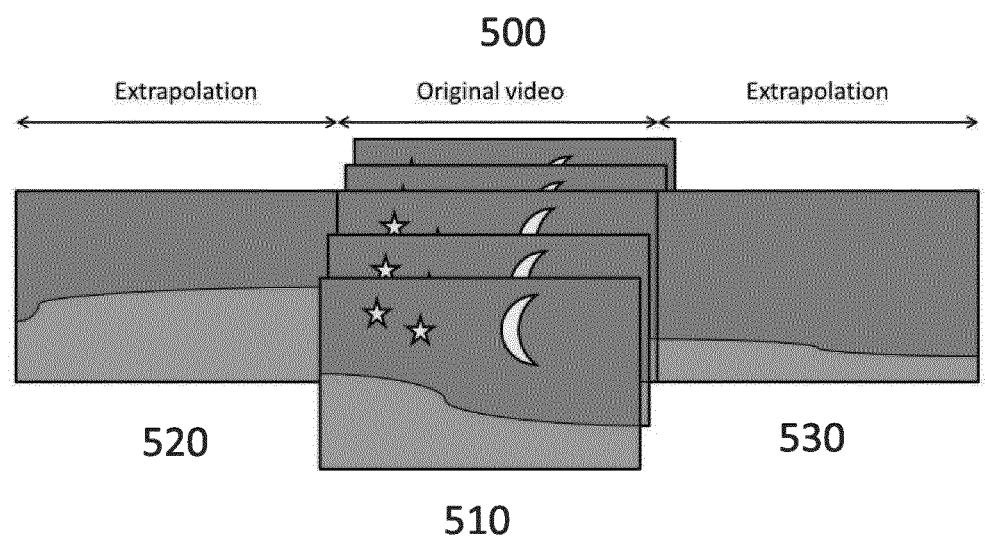
FIG. 5 illustrates an exemplary image including an original image and extrapolated images generated and display beyond the left and right borders of the original image, wherein multiple frames from the original video are used.
Figure 6:
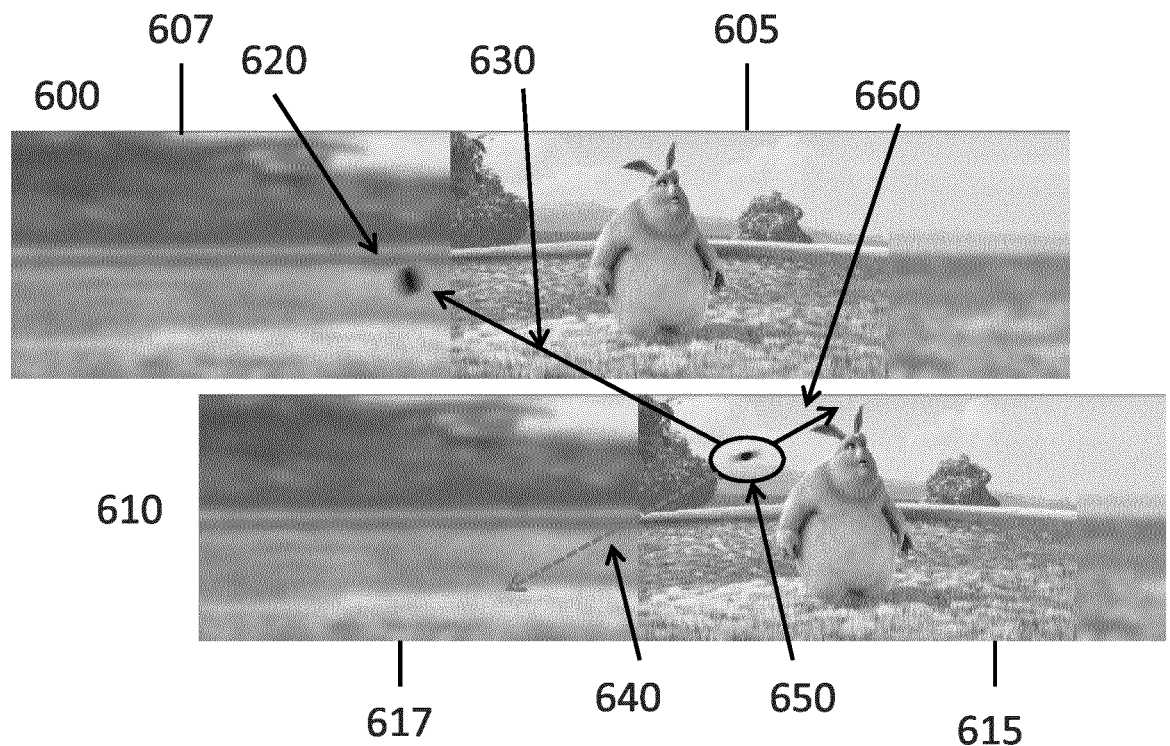
FIG. 6 illustrates an aspect of generating an extrapolated image in accordance with the present principles.

FIG. 4 illustrates an example image display having extrapolated images 420 and 430 generated based on an original image 410. It can be seen that the respective extrapolated images are different and generated in a manner to extend the original image beyond both the left and right borders of the original image 410.

Saliency-Aware Extrapolation

In accordance with the present principles, salient parts of the original image, that is parts that may be distracting to a viewer if the parts are included in the extrapolated, or peripheral, images, are penalized in the sense that they are either concealed or not included in the extrapolated images to avoid the appearance of distracting areas with incoherent motion on the extrapolated image. Salient may refer to the characteristic that the object may attract the gaze of a viewer, which may occur unconsciously, thereby distracting the viewer's attention. In another aspect of the present principles, the identified salient objects can be added afterwards to the extrapolated image with appropriate trajectory as described further below.

$A(x,t)$ is the saliency map, normalized between 0 and 1 representing the degree to which the pixel x of frame t is salient. Saliency may be computed using a visual attention model, for example, the one presented in EP patent 1 695 288 B1, filed Dec. 14, 2004, Le Meur, et al., the disclosure of which is incorporated by reference herein in its entirety.

According to the present principles, an embodiment determines the area of the extrapolated image in which the salient object would appear and generates the extrapolated image without the salient object included therein. The extrapolated image with the missing area reconstructed may be generated using, for example, the technique described in a Patent Application entitled "Apparatus and Method for Generating an Extrapolated Image using a Recursive Hierarchical Process", to Urban, et al., U.S. Ser. No. 15/538,647, the disclosure of which is incorporated by reference herein in its entirety.

In an embodiment, the extrapolation technique described by Urban, et al. is modified to penalize the salient areas in the original image during the block matching process so that the extrapolated image is generated without the salient objected included therein. Thus, if no salient area are used to extrapolate the image, no distractive parts will be present on the extrapolated image.

The matching measure (or score) used in the block matching or patch match search includes the saliency as explained below. As such, the salient parts of the image are penalized as references for the block matching and less distracting areas appear in the extrapolated image.

A patch-match technique can be used to reconstruct the missing area. In order to build the block M, containing both existing and new pixels from S, the cost r is minimized:

$$r(S)=SSD(S_a,M_a)+\lambda \times A(S)$$

Where SSD is the sum of absolute difference for example in the Lab color space, or RGB color space, $M_a$ is the already computed part of the block, $S_a$ is the part of existing block S that correspond to the shape of $M_a$, $\lambda$ is a weight to control the impact of the salience ($\lambda=100$).

The chosen block S is the one that minimizes previous equation:

$$M=_{S\in\Omega}{}^{argmin}r(S)$$

Where $\Omega$ is the search window in existing image.

As an extension of the algorithm, the block M can be built from n matching blocks $S_i$ blended together. A sorted list of best matches $S_i$ is constructed using equation above (i.e. minimizing $r(S)$, $S_i \neq S_j \forall i \neq j$, $S_i \in \Omega$). The block M is obtained by combination of the blocks $S_i$:

$$M = \frac{1}{n}\sum S_i$$

The combination of blocks $S_i$ can also be weighted $$M=\Sigma b_i S_i$$

Where the weights $b_i$ are learned through LLE optimization [7].

As an improvement, in order to ensure that only coherent blocks are used, blocks S with a score $r(S)$ too high ($r(S_i) \geq q$) can be rejected:

$$M = \sum_{i\in[1,n]|r(S_i)<q} b_i S_i$$

Multiple Reference Frames

In order to reconstruct parts of objects in the border of an image that fully appears in previous or next frames, the search space $\Omega$ can be extended to several neighboring frames, using the techniques presented above.

In case of slow motion, a lot of neighboring frames can be necessary for an object to completely appear. In order to reduce the search time, $\Omega$ can be appropriately chosen using the algorithm below in which reference frames are selected to avoid a full search, and the selected frames are used in the patch-match scheme:

The algorithm comprises a step of shot detection where frames are grouped by scene. A scene is defined by consecutive frame between two scene cuts [8].

At most n images are selected in the scene, by choosing evenly spaced images.

An improvement consists in keeping only images that differ sufficiently. SSD is computed between 2 candidate images. If the SSD is below a threshold, meaning that the images are too close to each other, only one is kept. This allows reducing the search image list to accelerate computations when not necessary.

Spatio-Temporal Smoothing

In the periphery of the visual field, the human visual system is sensitive to motion, and blinking effects. It has however very low sensitivity color and resolution.

Distracting undesired moving objects are already avoided thanks to the saliency aware filtering presented previously. In addition, blinking artifacts are reduced using a temporal filter. The temporal filter is for example a Gaussian smoothing applied in the temporal dimension. Resulting pixel is computed from a linear combination of collocated pixels in previous and next frames, the weights being defined by a Gaussian distribution around the center pixel.

In addition, and to avoid the extrapolated image from being too distractive, a spatial smoothing filter can also be applied in the spatial dimension. While the observer keeps his attention on the front screen, the smoothing is not perceivable, because the observer does not see the details on the periphery of the visual field, but it prevents the side projections from driving the user's attention.

Assume the visual acuity at 20° of eccentricity is 1/10th that of central vision [13]. This corresponds to the edge of the screen for an observer situated 4 meters in front of a 3 meters width screen. This means that the resolution on the peripheral screen should be 1/10th that of central resolution. The Gaussian filter used in the spatial filtering should therefore have a standard deviation of $$\sigma = \frac{10}{\pi} \text{pixels,}$$

considering the resulting resolution of the extension and its projection are the same as the central view, where the maximum frequency is ½ cycle per pixel. These parameters must be adapted if the resulting extension and projection change from the central view.

In an alternative embodiment, the extrapolation technique of Urban et al. is used to initially generate an extrapolated image. The extrapolated image is then analyzed to determine whether salient objected are included in the extrapolated image, for example, using a saliency mapping. If the extrapolated image is found to include salient object, the salient objects may be removed, and the missing areas of the extrapolated image can be filled using inpainting, or the modified technique of Urban et al. This can be seen as post-processing of an already computed extrapolated image.

Object Insertion and Trajectory Extrapolation

Once an extrapolated image, or side content, has been generated with a smooth background, automatically or manually by any editor, it may be desirable to add moving objects with appropriate trajectory entering or leaving the front screen. This part describes how this can be done, fully automatically, or with user input.

Figure 7:
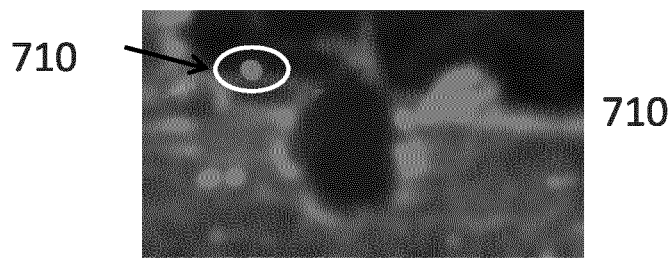
FIG. 7 illustrates an aspect of object detection in an image in accordance with the present principles.

Objects of interest can be selected manually by defining a rectangle or a closed contour around the object. Detection of an object of interest is done, for example, by using a saliency map in FIG. 7. Object 710 in FIG. 7 corresponds to object 650 in image portion 615, which is adjacent extrapolated image portion 617. Image 600 having image portion 605 and extrapolated image portion 607 shows object 650 included in the extrapolated image as indicated by reference numeral 620. Object 650 can be selected either manually or using a blob detector such as the one described in [9].

To estimate the trajectory of the object, a tracker is then used, initialized on the area defined in the selection step. Any tracker can be used, for example, those described in [10] [11]. The tracker is used to estimate the object center position p in frame t: p(t). The tracking is performed in forward and backward directions in order to be able to extrapolate object trajectories leaving or entering the front screen. For backward direction, the frame order is inverted and the following equations still apply with a variable change. Therefore, only example of object leaving the front screen will be presented in the following.

The first step is to model the parametric trajectory of the tracked object center position p(t)=(x(t),y(t)). The parametric model used can be a linear (constant speed), parabolic (constant acceleration), or more complex trajectory. For example, if a parabolic trajectory is used: p(t)=($at^2$+bt+c, $dt^2$+et+f), with t representing the frame number, a, b, c, d, e, f parameters estimated through regression using estimated positions. The number of estimated position must be greater than 3 to estimate the parameters, but a higher number allows reducing the effects of noise. However, a number of observation frames must be kept below a certain number for the motion model to hold (practically, the number of estimated positions must be kept under 30 by dropping oldest estimations). The trajectory is estimated for each frame.

Next step is to detect whether the object is leaving the screen or not. This can be done by observing the next object center position $p(t_0+1)$. If $x(t_0+1)$ is outside the images boundaries, it is estimated that the object is leaving the screen. The object position can then be estimated for every subsequent frame using the estimated parametric equation.

For more robustness, it must be ensured that the estimated trajectory is consistent. The object insertion is stopped when:

horizontal speed too low: abs(2at+b)<$v_0$, where the minimum initial speed $v_0$=5 pixels per frame, to avoid static objects from being displayed on the extensions,
y(t) falls outside of vertical image boundaries,
Horizontal motion become null:

$$t = \frac{-b}{2a},$$

if a≠0, b≠0 otherwise,
Horizontal position x(t) falls outside the image boundaries.

The object is finally inserted in subsequent frames, at the extrapolated positions. The appearance can be simply the object cut in the last frame it appeared, or a combination (using some blending technique) of the last appearances. To be inserted seamlessly, cloning techniques can be used, such as described in [12] using Poisson editing. Less computationally intensive techniques such as using alpha mask blending or blurring after the insertion can also be used.

Figure 8:
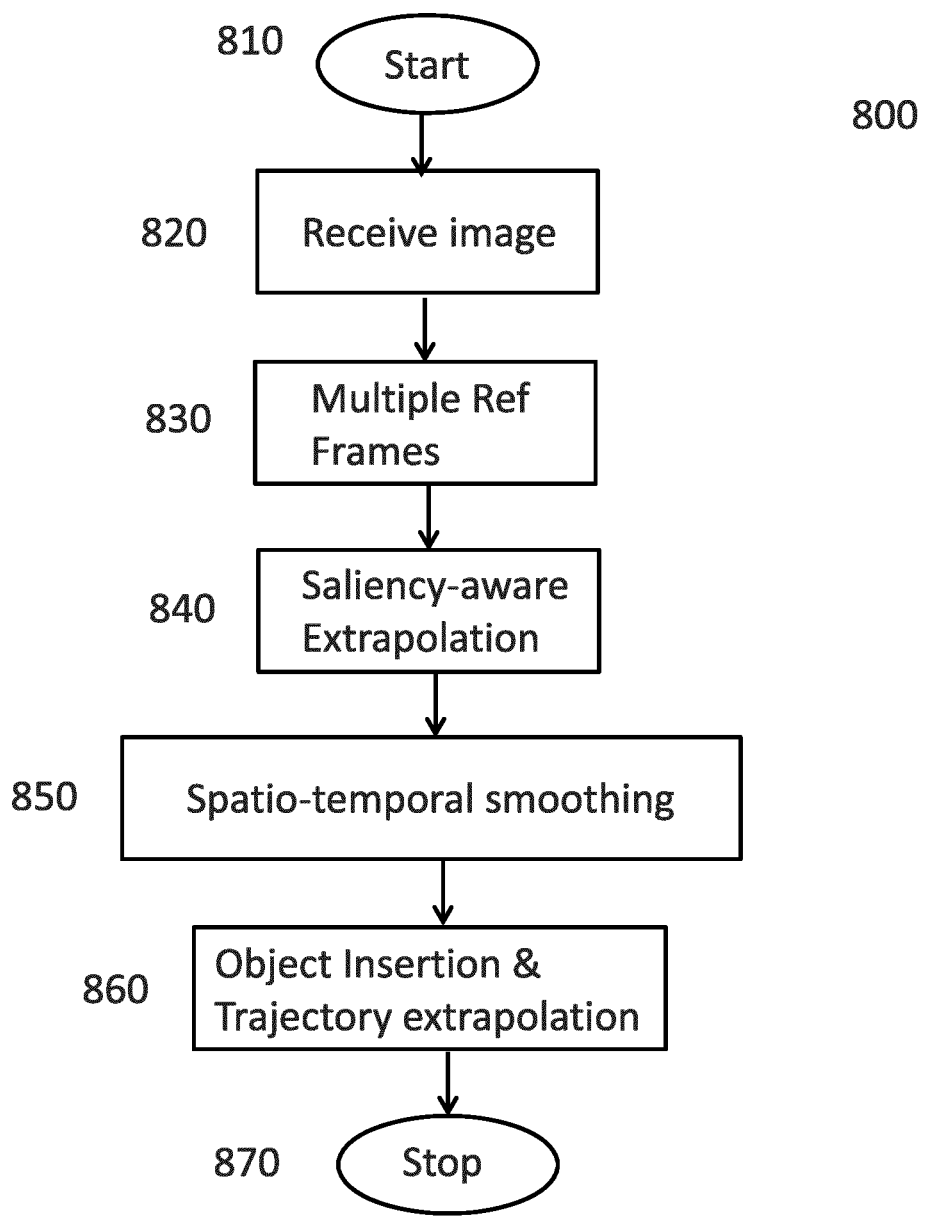
FIG. 8 illustrates an exemplary process for generating an extrapolated image in accordance with the present principles.

FIG. 8 illustrates an exemplary process in accordance with the present principles. Process 800 begins by receiving an image to be extended in step 820. In step 830, multiple reference frames may be selected for analysis in generating the extrapolated image, however, a single reference frame may be used if desired. In step 840, saliency aware extrapolation is used to generate an extrapolated image, for example, by modifying the block matching technique of Urban, et al. to penalize salient areas in the original image to generate extrapolated images in which the distracting parts are not present. Spatio-temporal smoothing may be performed in step 850. Finally, if desired, a detected salient object may be selected, either manually or automatically, and inserted based on trajectory extrapolation in step 860.

Figure 9:
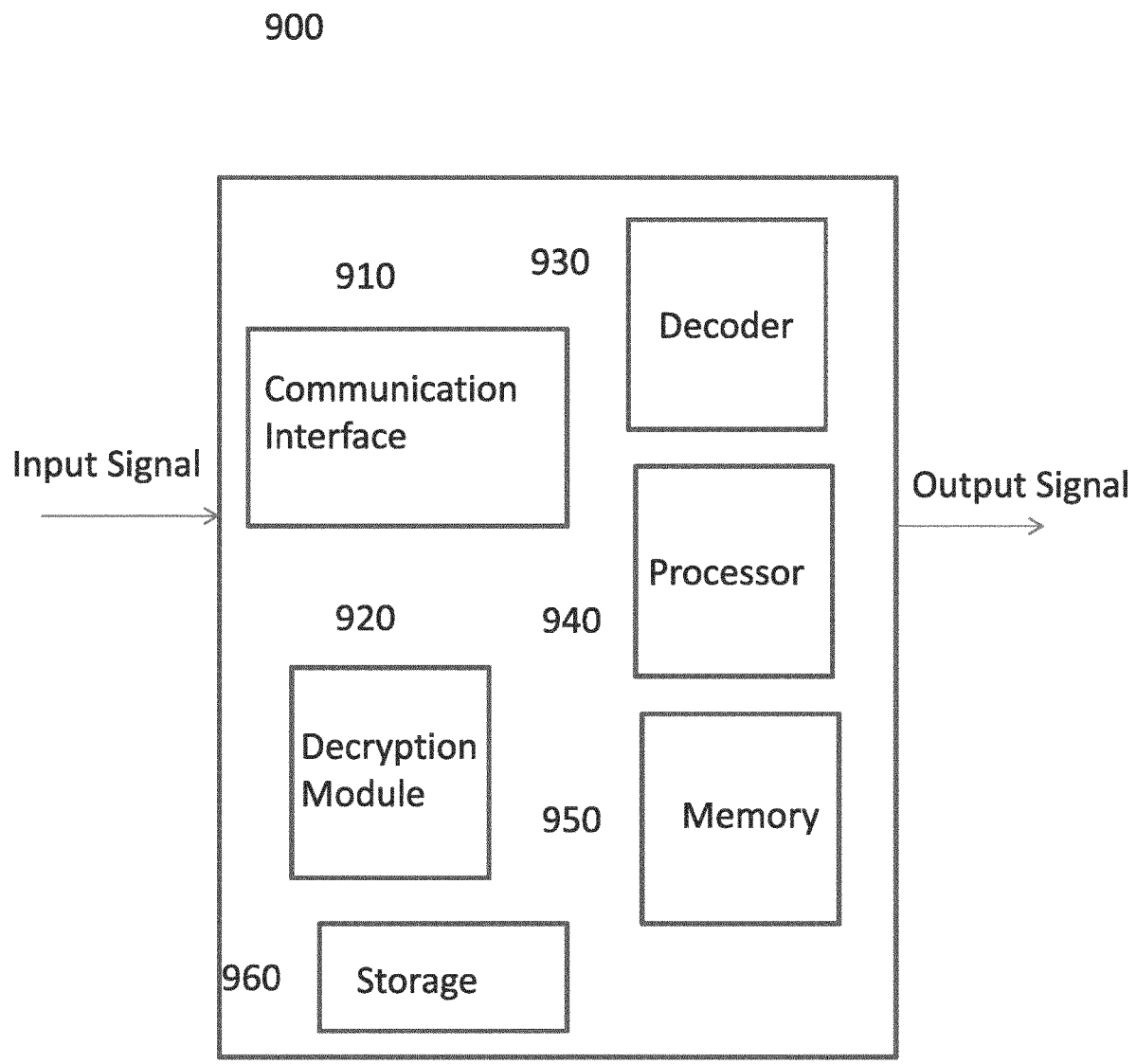
FIG. 9 illustrates an exemplary apparatus for generating and/or processing an extrapolated image in accordance with the present principles.

FIG. 9 illustrates a block diagram of an exemplary system in which various aspects of the exemplary embodiments of the present principles may be implemented. System 900 may be embodied as a device including the various components described below and is configured to perform the processes described above. Examples of such devices, include, but are not limited to, personal computers, laptop computers, smartphones, tablet computers, digital multimedia set top boxes, digital television receivers, personal video recording systems, connected home appliances, and servers. System 900 may be communicatively coupled to other components, for example, a signal receiving apparatus, a projection system, a display system, or the like, to both receive film and video data, process the film and video data as described above, and project or display the extrapolated images with the received film and video data to provide the immersive viewer experience.

The system 900 may include at least one processor(s) 940 configured to execute instructions loaded therein for implementing the various processes as discussed above. Processor(s) 940 may include embedded memory, input output interface and various other circuitry as known in the art. The system 900 may also include at least one memory 950 (e.g., a volatile memory device, a non-volatile memory device). System 900 may additionally include a storage device 960, which may include non-volatile memory, including, but not limited to, EEPROM, ROM, PROM, RAM, DRAM, SRAM, flash, magnetic disk drive, and/or optical disk drive. The storage device 960 may comprise an internal storage device, an attached storage device and/or a network accessible storage device, as non-limiting examples. Program code to be loaded onto processor(s) 940 to perform the various processes described hereinabove may be stored in storage device 960 and subsequently loaded onto memory 950 for execution by processor(s) 940. System 900 may also include an decryption module 920 configured to receive and decrypt encrypted film and/or video data. The image data generated by processor(s) 940 may be output via an output port to display device(s), or alternatively system 900 may be integrated with a display, wherein the output signal is directly applied to display the images on a display of system 900.

System 900 may include a decoder 930 that decodes the received input signals as necessary, which may be in compressed form in accordance with any of the known compression formats, for example, MPEG2 or H.264. Decoder 930 may be implemented as a separate component within system 900 or may be incorporated as a part of processor(s) 940 as known in the art.

Decryption module 920 represents the module(s) that may be included in a device to perform the decryption functions. As is known, a device may include one or both of the encryption and decryption modules, for example, encryption may be done on a regular PC since encryption does not involve secret key so that the PC need not include secure memory for storing the input parameters (i.e., the public system parameters and the user's identity). Decryption however, requires secret keys (i.e., the decryption key) and is done in a secure device, for example a smart card. Additionally, decryption module 920 may be implemented as a separate element of system 900 or may be incorporated within processor(s) 940 as a combination of hardware and software as known to those skilled in the art.

The system 900 may also include communication interface 910 that enables communication with other devices via a communication channel, either wired or wireless. The communications interface 910 may include, but is not limited to a transceiver configured to transmit and receive data from the communication channel. The communication interface may include, but is not limited to, a modem or network card and the communications channel may be implemented within a wired and/or wireless medium. The various components of system 900 may be connected or communicatively coupled together using various suitable connections, including, but not limited to internal buses, wires, and printed circuit boards.

The exemplary embodiments of this invention may be carried out by computer software implemented by the processor(s) 940 or by hardware, or by a combination of hardware and software. As a non-limiting example, the exemplary embodiments of this invention may be implemented by one or more integrated circuits. The memory 950 may be of any type appropriate to the technical environment and may be implemented using any appropriate data storage technology, such as optical memory devices, magnetic memory devices, semiconductor-based memory devices, fixed memory and removable memory, as non-limiting examples. The processor(s) 940 may be of any type appropriate to the technical environment, and may encompass one or more of microprocessors, general purpose computers, special purpose computers and processors based on a multi-core architecture, as non-limiting examples.

The foregoing has provided by way of exemplary embodiments and non-limiting examples a description of the method and systems contemplated by the inventor. It is clear that various modifications and adaptations may become apparent to those skilled in the art in view of the description. However, such various modifications and adaptations fall within the scope of the teachings of the various embodiments described above.

The embodiments described herein may be implemented in, for example, a method or a process, an apparatus, a software program, a data stream, or a signal. Even if only discussed in the context of a single form of implementation (for example, discussed only as a method), the implementation of features discussed above may also be implemented in other forms (for example, an apparatus or program). An apparatus may be implemented in, for example, appropriate hardware, software, and firmware. The methods may be implemented in, for example, an apparatus such as, for example, a processor, which refers to processing devices in general, including, for example, a computer, a microprocessor, an integrated circuit, or a programmable logic device. Processors also include communication devices, such as, for example, computers, cell phones, portable/personal digital assistants ("PDAs"), and other devices that facilitate communication of information between end-users.

Reference to "one embodiment" or "an embodiment" or "one implementation" or "an implementation" of the present principles, as well as other variations thereof, mean that a particular feature, structure, characteristic, and so forth described in connection with the embodiment is included in at least one embodiment of the present principles. Thus, the appearances of the phrase "in one embodiment" or "in an embodiment" or "in one implementation" or "in an implementation", as well any other variations, appearing in various places throughout the specification are not necessarily all referring to the same embodiment.

Additionally, this application or its claims may refer to "determining" various pieces of information. Determining the information may include one or more of, for example, estimating the information, calculating the information, predicting the information, or retrieving the information from memory.

Further, this application or its claims may refer to "accessing" various pieces of information. Accessing the information may include one or more of, for example, receiving the information, retrieving the information (for example, from memory), storing the information, processing the information, transmitting the information, moving the information, copying the information, erasing the information, calculating the information, determining the information, predicting the information, or estimating the information.

Additionally, this application or its claims may refer to "receiving" various pieces of information. Receiving is, as with "accessing", intended to be a broad term. Receiving the information may include one or more of, for example, accessing the information, or retrieving the information (for example, from memory). Further, "receiving" is typically involved, in one way or another, during operations such as, for example, storing the information, processing the information, transmitting the information, moving the information, copying the information, erasing the information, calculating the information, determining the information, predicting the information, or estimating the information.

As will be evident to one of skill in the art, implementations may produce a variety of signals formatted to carry information that may be, for example, stored or transmitted. The information may include, for example, instructions for performing a method, or data produced by one of the described embodiments. For example, a signal may be formatted to carry the bitstream of a described embodiment. Such a signal may be formatted, for example, as an electromagnetic wave (for example, using a radio frequency portion of spectrum) or as a baseband signal. The formatting may include, for example, encoding a data stream and modulating a carrier with the encoded data stream. The information that the signal carries may be, for example, analog or digital information. The signal may be transmitted over a variety of different wired and/or wireless links, as is known. The signal may be stored on a processor-readable medium.

While several embodiments have been described and illustrated herein, those of ordinary skill in the art will readily envision a variety of other means and/or structures for performing the functions and/or obtaining the results and/or one or more of the advantages described herein, and each of such variations and/or modifications is deemed to be within the scope of the present embodiments.

The invention claimed is:

1. A method comprising:
   accessing an image;
   generating a saliency map of a portion of the image based on a visual attention model, wherein the saliency map is a set of values, each value representing a degree to which a corresponding pixel of the portion of the image is salient, the saliency map indicating a salient object; and
   generating an extrapolated image that extends beyond a border of the image from the portion of the image, so that the salient object is not included in the extrapolated image.

2. The method according to claim 1, wherein the generating comprises using a recursive hierarchical process to progressively generate higher resolution extrapolated images.

3. The method according to claim 2, wherein the recursive hierarchical process is based on using prediction and weighting of overlapping blocks in a previous resolution level to generate the blocks of the next resolution level.

4. A method comprising:
   accessing an image;
   generating an extrapolated image that extends beyond a border of the image from a portion of the image;
   generating a saliency map of the extrapolated image based on a visual attention model, wherein the saliency map is a set of values, each value representing a degree to which a corresponding pixel of the extrapolated image is salient, the saliency map indicating a salient object;
   modifying the extrapolated image so that the salient object is not included in the modified extrapolated image.

5. The method according to claim 1, further comprising applying spatial filtering to the extrapolated image.

6. The method according to claim 1, further comprising selecting an object of interest and inserting the object of interest into the extrapolated image.

7. The method according to claim 6, wherein a trajectory of the object of interest is estimated from a plurality of images to insert the object of interest into the extrapolated image based on the estimated trajectory.

8. An apparatus comprising:
   an input configured to access an image;
   at least one processor, coupled to the input, and configured to:
      generate a saliency map of a portion of the image based on a visual attention model, wherein the saliency map is a set of values, each value representing a degree to which a corresponding pixel of the portion of the image is salient, the saliency map indicating a salient object;
      generate an extrapolated image that extends beyond a border of the image from the portion of the image, so that the salient object is not included in the extrapolated image; and
   an output configured to output the extrapolated image.

9. The apparatus according to claim 8, wherein the processor is configured to generate the extrapolated image using a recursive hierarchical process to progressively generate higher resolution extrapolated images.

10. The apparatus according to claim 9, wherein the recursive hierarchical process is based on using prediction and weighting of overlapping blocks in a previous resolution level to generate the blocks of the next resolution level.

11. An apparatus comprising:
    an input configured to access an image;
    at least one processor configured to generate an extrapolated image that extends beyond a border of the image from a portion of the image, to generate a saliency map of the extrapolated image based on a visual attention model, wherein the saliency map is a set of values, each value representing a degree to which a corresponding pixel of the extrapolated image is salient, the saliency map indicating a salient object, and to modify the extrapolated image so that the salient object is not included in the modified extrapolated image; and
    an output configured to output the modified extrapolated image.

12. The apparatus according to claim 8, wherein the processor is further configured to apply spatial filtering to the modified extrapolated image.

13. The apparatus according to claim 8, wherein the processor is further configured to select an object of interest and insert the object of interest into the extrapolated image.

14. The apparatus according to claim 13, wherein the processor is further configured to estimate a trajectory of the object of interest from a plurality of images and to insert the object of interest into the extrapolated image based on the estimated trajectory.

15. A non-transitory computer-readable storage media, comprising computer-executable instructions for:
    accessing a portion of an image;
    generating a saliency map of the portion of the image based on a visual attention model, wherein the saliency map is a set of values, each value representing a degree to which a corresponding pixel of the portion of the image is salient, the saliency map indicating a salient object;

generating an extrapolated image that extends beyond a border of the image from the portion of the image, so that the salient object is not included in the extrapolated image.

16. A non-transitory computer-readable storage media, comprising computer-executable instructions for:
accessing an image;
generating an extrapolated image that extends beyond a border of the image from a portion of the image;
generating a saliency map of the extrapolated image based on a visual attention model, wherein the saliency map is a set of values, each value representing a degree to which a corresponding pixel of the extrapolated image is salient, the saliency map indicating a salient object; and
modifying the extrapolated image so that the salient object is not included in the modified extrapolated image.

17. The method according to claim 4, further comprising applying spatial filtering to the extrapolated image.

18. The method according to claim 4, further comprising selecting an object of interest and inserting the object of interest into the extrapolated image.

19. The method according to claim 18, wherein a trajectory of the object of interest is estimated from a plurality of images to insert the object of interest into the extrapolated image based on the estimated trajectory.

20. The apparatus according to claim 11, wherein the processor is further configured to apply spatial filtering to the modified extrapolated image.

21. The apparatus according to claim 11, wherein the processor is further configured to select an object of interest and insert the object of interest into the extrapolated image.

22. The apparatus according to claim 21, wherein the processor is further configured to estimate a trajectory of the object of interest from a plurality of images to and to insert the object of interest into the extrapolated image based on the estimated trajectory.

* * * * *